Aug. 11, 1936.    J. J. JOHNSON    2,050,571
PHOTOGRAPHIC APPARATUS
Filed Dec. 21, 1934    4 Sheets-Sheet 2

Inventor
John J. Johnson
By
Jack A. Shiley
Attorney

Aug. 11, 1936.     J. J. JOHNSON     2,050,571
PHOTOGRAPHIC APPARATUS
Filed Dec. 21, 1934     4 Sheets-Sheet 3
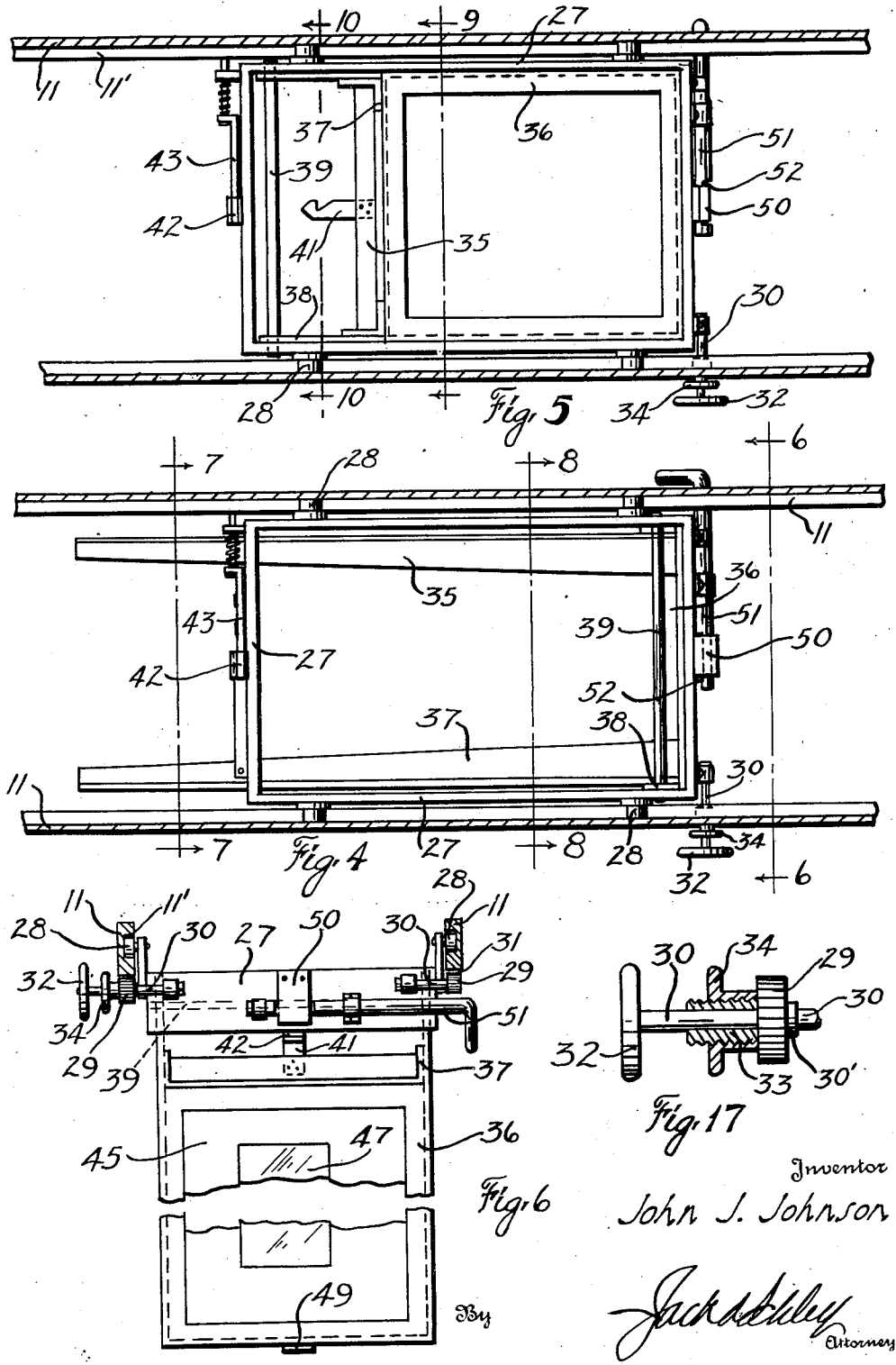
Inventor
John J. Johnson Aug. 11, 1936.   J. J. JOHNSON   2,050,571
PHOTOGRAPHIC APPARATUS
Filed Dec. 21, 1934   4 Sheets-Sheet 4
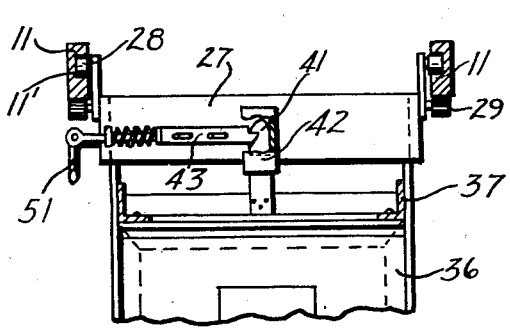
Fig. 7
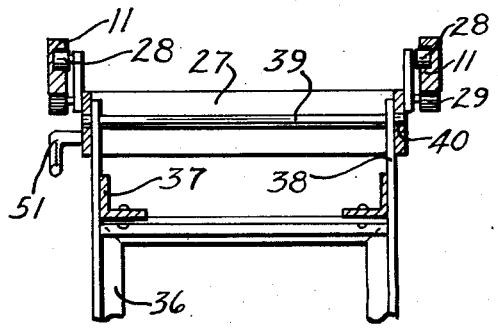
Fig. 8
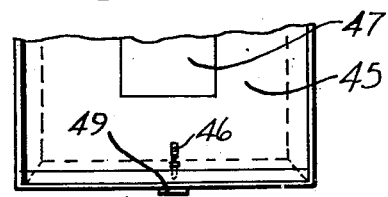
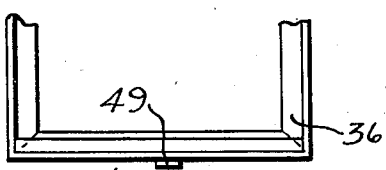
Fig. 10
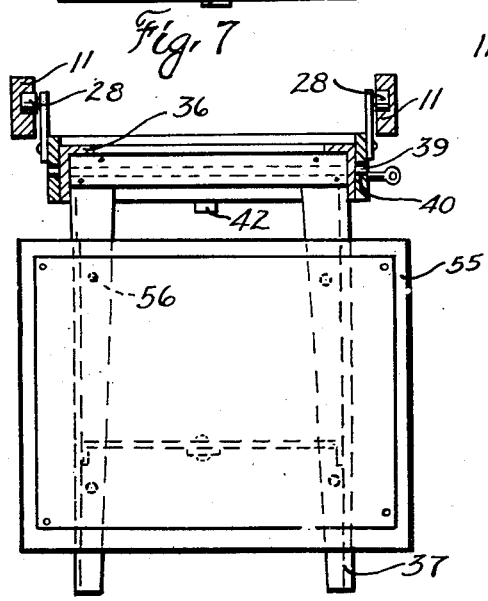
Fig. 9
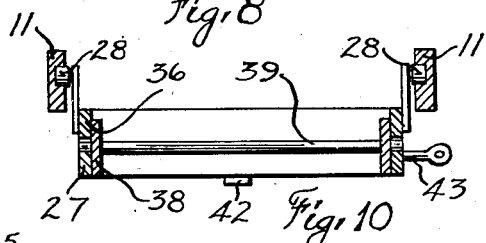
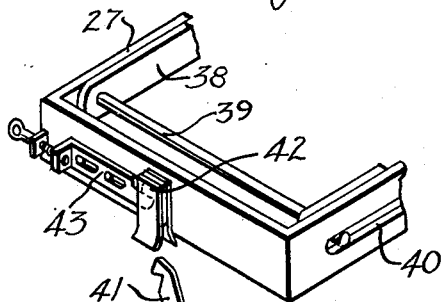
Fig. 14
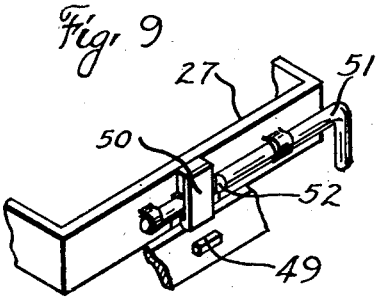
Fig. 15
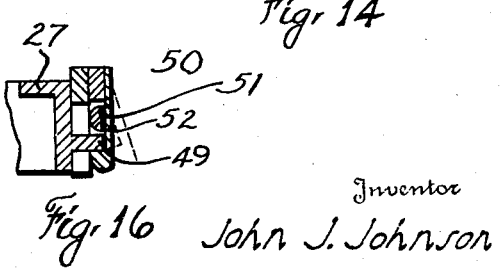
Fig. 16
Inventor
John J. Johnson
By Jack A. Athey
Attorney Patented Aug. 11, 1936

2,050,571

UNITED STATES PATENT OFFICE 2,050,571

PHOTOGRAPHIC APPARATUS

John J. Johnson, Dallas, Tex.

Application December 21, 1934, Serial No. 758,620

2 Claims. (Cl. 88—24)

This invention relates to new and useful improvements in photographic apparatuses.

One object of the invention is to provide an improved apparatus for making a photo-copy in a "dark room" from an outside subject, whereby the copy may be developed therein directly after taking, thereby eliminating the danger of exposing said copy before development, which danger is present when the copy is made in a lighted room, as is the usual practice.

An important object of the invention is to provide a photographic apparatus wherein cut sheets of sensitized paper, which are the exact size of the photo-copy to be made, may be used, thereby eliminating the necessity of using a roll of photographic paper which is undesirable because of the waste caused by trimming said paper to the size of the different photo-copies made.

Another object of the invention is to provide an improved hanger adapted to be mounted within a "dark room" for supporting the photographic paper on which photo-copies are made, whereby the hanger is completely out of the way and the floor of said room is clear.

A further object of the invention is to provide a frame having a pair of supporting sections for carrying photographic paper, the sections being of different sizes, whereby various size photo-copies may be carried, the frame being arranged to be swung, whereby one of the sections may be swung into alinement with the photographic lens; the entire frame being adjustable laterally to vary its distance from said lens to accommodate different sizes of photo-copies.

Another object of the invention is to provide improved means for supporting a cut sheet of sensitized paper on which a photo-copy is to be made, whereby the sheet, regardless of its size, is always in alinement with the center of the camera lens so as to eliminate distortion and produce a clear-cut photo.

A construction designed to carry out the invention will be hereinafter described, together with other features of the invention.

Figure 1:
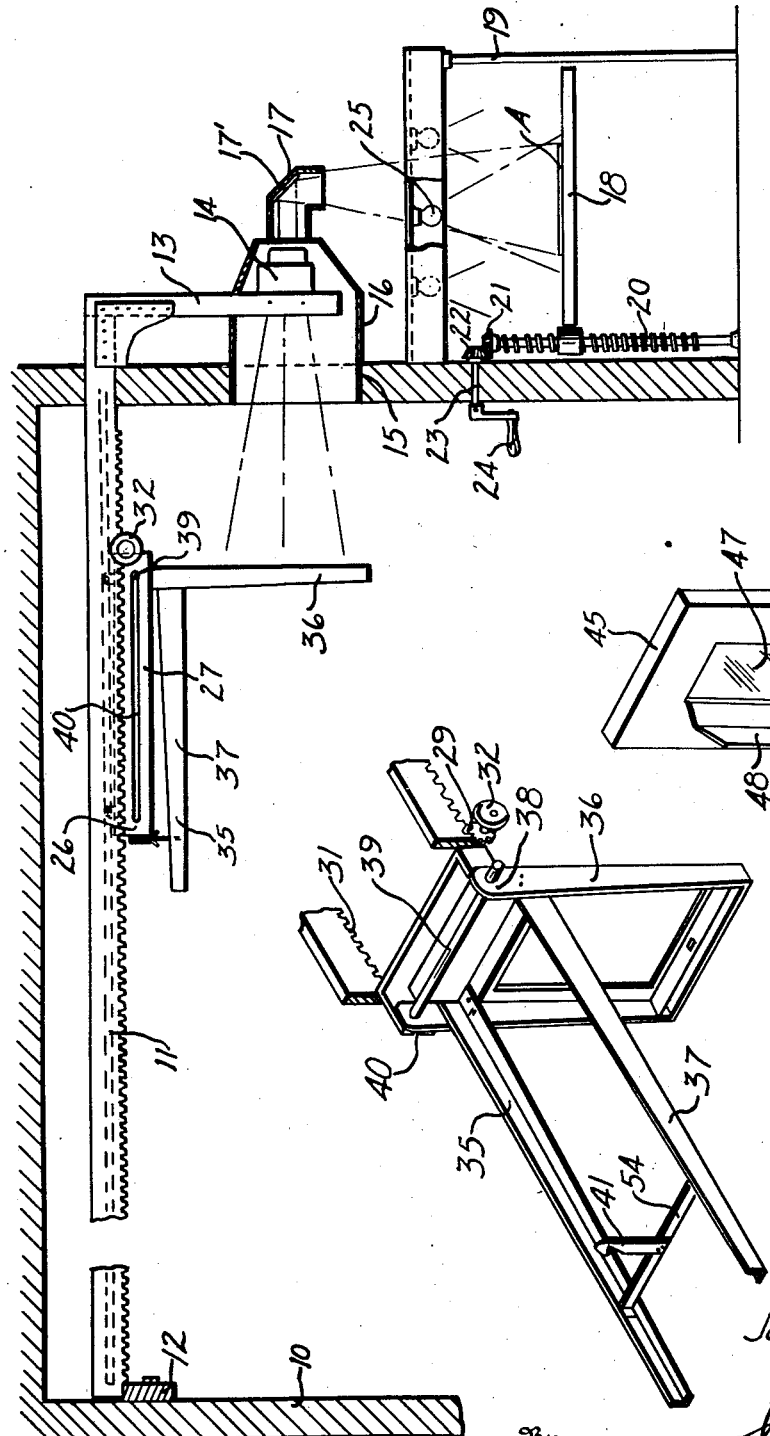
Figure 2:
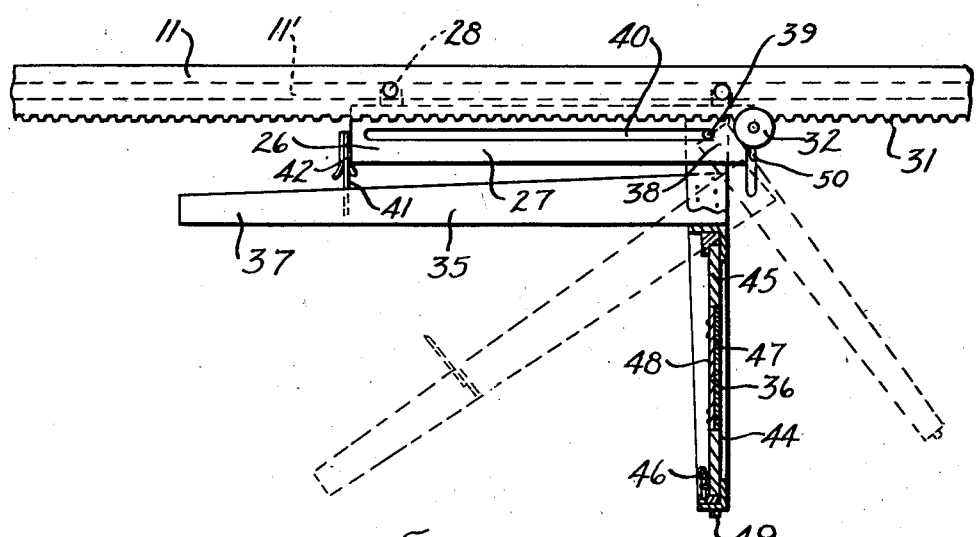
Figure 3:
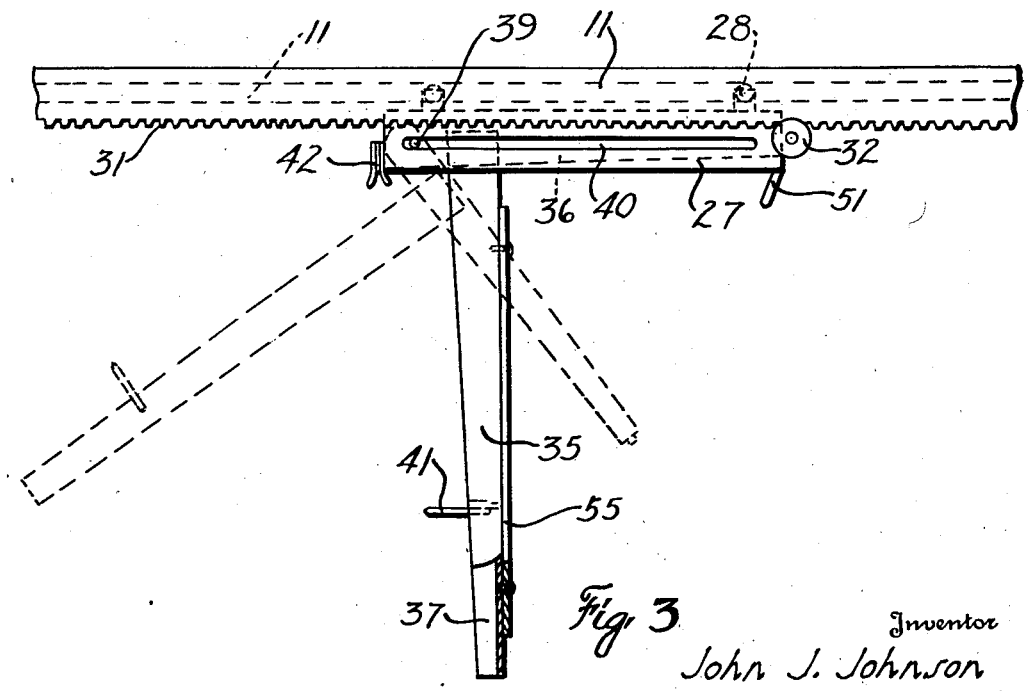

The invention will be more readily understood from a reading of the following specification and by reference to the accompanying drawings, in which an example of the invention is shown, and wherein:

Figure 1 is a side elevation of a photographic apparatus constructed in accordance with the invention, Figure 2 is an enlarged view, partly in elevation and partly in section, of the hanger, and showing the supporting frame swung to one photographing position, Figure 3 is an enlarged side elevation of said hanger showing the supporting frame swung to its other photographing position, Figure 4 is a plan view of the parts shown in Figure 2, Figure 5 is a plan view of the parts shown in Figure 3, Figure 6 is a transverse vertical sectional view, taken on the line 6—6 of Figure 4, Figure 7 is a transverse vertical sectional view, taken on the line 7—7 of Figure 4, Figure 8 is a transverse vertical sectional view, taken on the line 8—8 of Figure 4.

Figure 9 is a transverse vertical sectional view, taken on the line 9—9 of Figure 5, Figure 10 is a transverse vertical sectional view taken on the line 10—10 of Figure 5, Figure 11 is an isometrical view of the swinging frame, Figure 12 is an isometrical view of the insertable frame for supporting the photographic paper, Figure 13 is a horizontal cross-sectional view of the same, Figure 14 is an enlarged detail of the latch for the major leg section of the swinging frame, Figures 15 and 16 are details of the latch for the minor leg section of said swinging frame, and Figure 17 is a detail of the sliding frame locking means.

In the drawings the numeral 10 designates the walls of an ordinary photographic "dark room", wherein plates, films, and the like, are developed. A pair of overhead longitudinal, parallel tracks, or rails 11 are disposed within the room near the ceiling thereof. Each rail has its inner end supported on a cross bar 12 secured to the rear wall of the room, while the other end of each track extends outwardly through the front wall of said room. The outer projecting end of each rail is provided with a downwardly extending arm 13 and these arms carry the camera or photographic lens housing 14 at their lower ends. Thus it will be seen that the rails extend through the dark room while the camera lens is supported outside thereof.

An opening 15 is provided in the outer wall of the room and this opening is in alinement with the lens whereby a projection through the lens into the dark room is possible. A cylindrical casing 16 surrounds the opening and extends outwardly from the wall so as to enclose the camera lens housing 14, whereby light is excluded from the dark room. A tubular elbow 17, having its outer end directed downwardly, is secured to the outer end of the casing in axial alinement with the camera lens. A mirror 17' is disposed at an angle within the elbow (Figure 1).

A horizontal platform or table 18 is mounted beneath the casing and elbow on vertical legs 19 and worm screws 20. The screws are operated by angular gears 21 and 22, the latter having a shaft 23 extending through the wall of the dark room. A crank 24 is fastened on the inner end of the shaft within said room and it is obvious that rotation of the crank will rotate the screws 20, which are suitably journaled, so as to raise and lower the platform with relation to the casing and elbow. This permits vertical adjustment of said platform from within the dark room.

The original object or sheet A, of which a photo-copy is to be made, is placed on the platform which has been properly adjusted. The sheet or object is centered with relation to the elbow. Suitable electric lamps 25 illuminate the sheet A, and an image of this sheet is reflected by the mirror 17' through the camera lens into the dark room.

For supporting photographic or sensitized paper within the dark room to receive the image projected through the camera lens, a hanger 26 is slidably mounted on the rails 11. The hanger comprises a rectangular carrier 27 which is approximately the width of the space between the rails. A pair of rollers 28 are carried by the carrier above the same, and these rollers engage in grooves 11' in the inner side of each rail, whereby the carrier is suspended from and slidably mounted on the track.

For steadying the carrier during its travel, and also for locking it in any desired position, said carrier is provided with a pair of pinions 29. Each pinion is mounted on the outer end of a stub shaft 30 journaled in a bearing 31 on one end of the carrier. The pinions engage gear racks 31 on the bottom edges of the rails and one of the stub shafts is provided with a hand wheel 32. Rotation of the hand wheel will rotate the pinion carried thereby to move the frame along the track. This stub shaft also carries a sleeve 33 (Figure 17) which has a lock nut 34 screw-threaded thereon. When this nut is tightened against the face of the pinion, said pinion is frictionally held against rotation between the end of said nut and an annular shoulder 30' on the shaft. Thus, it will be seen that the carrier 27 may be readily locked in any position along the tracks. An angular supporting hanger or frame 35 is mounted to swing in the carrier and includes a minor section 36 and a major section 37. The sections are positioned at substantially right angles to each other, and the frame is of such width as to fit within the carrier. The section 36 is provided with upwardly extending ears 38, which lie contiguous to the inner sides of the carrier. A transverse shaft 39 extends through the ears and has its ends supported in longitudinal slots 40 (Figures 2, 3, and 11) in the sides of the carrier, whereby the frame is not only slidable in said slots, but is pivotally suspended from the carrier. Due to the angular disposition of the sections 36 and 37, it is obvious that when one is in a horizontal position, the other is in a vertical position within range of the photographic lens.

As shown in Figures 2, 4, 6, 7, and 8, when the section 36 is in a vertical position, the section 37 lies substantially parallel along the bottom of the carrier. The frame is held in this position by a hook 41 carried by the section 37, and engaging in a keeper 42 (Figures 7 and 14) on the rear end of the carrier. The hook is retained in the keeper by a slidable, spring-pressed latch 43 also mounted on the carrier. Thus, it will be seen that the frame is rigidly secured to the carrier in this position and said carrier and frame are capable of movement as a unit along the tracks.

The section 36 is preferably constructed of angle bars which form a rectangular holder 44 (Figures 6, 7, and 8). This holder receives a frame 45 which is fastened therein by a latch 46 (Figures 2 and 7), whereby the frame is readily removable. As is best shown in Figures 2, 12, and 13, the frame is provided with a central glass window 47 which is arranged to be closed by a double hinged door 48. A cut sheet of photographic paper, is inserted in the window with its front side against the glass and the door closed to hold the paper therein. The double-hinging of the door facilitates insertion of the paper. It is obvious that with the frame 45 within the holder, and the paper in the window, the image is projected from the mirror 17 through the lens and onto said paper. There is no distortion because the window is centrally located in the frame in direct alinement with the lens and a clear cut image is produced.

Since the frame 45 is readily removable, it is possible to quickly and easily substitute a frame having a different size window, whereby a photo-copy of a different size may be made. Thus, it is obvious that cut sheets of photographic paper of the size of the copy to be made may be employed. This does away with using a roll of paper which must be wide enough to accommodate the largest copy ever made, and which must therefore be trimmed when smaller photo-copies are made, thereby resulting in a great waste of paper.

Since the size of the holder 44 formed in the minor section 36 of the frame is of a certain size, it is obvious that when it is desired to make photo-copies of a larger size, this holder will not accommodate them. In such case, the major section 37 which is larger, is employed. To swing this major section into the field of camera lens, it is only necessary to release the latch 43, which permits the frame 35 to swing to the position shown in dotted lines in Figure 2. The entire frame is then moved along the slots of the carrier until the transverse shaft 39 is at the opposite end of the carrier (dotted lines Figure 3). The frame is then swung to the position shown in full lines in Figure 3, with the minor section 36, swung upwardly within the carrier. The parts are held in this position by a lug 49 (Figures 15 and 16) on the end of the section 36, engaging a spring keeper 50 on the carrier. The keeper may be disengaged by rotating a shaft 51 which is mounted on one end of the carrier. The shaft is provided with a cut-out portion 52 receiving said keeper. By observing Figure 16, it will be seen that when the keeper is within the cut-out portion of said shaft the lug 49 serves to hold the frame in the position shown in Figure 3. When the shaft 51 is rotated, the keeper is swung outwardly and disengages the lug, as is shown in dotted lines in Figure 16.

The major section 37 comprises a pair of arms 53 angular in cross section which are connected by a cross bar 54. The bar 54 carries the hook 41 which latches the frame to the carrier when the section 37 is in a horizontal position. The arms 53 have an enlarged board 55 removably secured thereto by screws 56, or other suitable means. This board is sufficiently large to accommodate the largest photo-copy to be made. The cut sheet of photographic paper is secured on this board with thumb tacks, or other means, and it is obvious that the paper may always be positioned centrally of the board, and also centrally of the lens, to eliminate distortions and produce clear cut pictures.

The entire hanger is mounted in the dark room which eliminates any danger of exposure of the photographic paper. Since the size of the photo-copy to be made depends upon the distance that the sensitized sheet is from the lens, and also upon the distance the object on the platform 18 is from the casing 14, the adjustments of the supports may be readily accomplished from within the dark room by rotating the crank 24. The provision of the swinging frame 35 permits cut sheets of paper to be used and eliminates all waste of paper caused by trimming and cutting. The minor section 36 accommodates sheets up to a certain size and then by swinging the frame the major section 37 will accommodate any above that size. It is pointed out that when the section 36 is swung to a horizontal position within the carrier, the removable frame 45 is removed therefrom. Similarly, when the section 37 is in its horizontal position, the board 55 is removed therefrom.

Since the carrier and swinging frame are located to run on a fixed track, it is obvious that the leg sections 36 and 37 are always in perfect alinement with the camera lens. There is no possibility of their getting out of adjustment in this respect. Since all the developing is done in the dark room it is particularly advantageous to make the entire photo-copy in this one room. It not only produces better photo-copies but also provides for a great saving of time. By locating the hanger overhead the floor of the room is kept clear and may be utilized for other purposes. It is further pointed out that by using the hanger within the dark room, the provision of a light proof housing for the sensitized paper is eliminated, as is necessary when photo-copies are made in a lighted room.

What I claim and desire to secure by Letters Patent, is:

1. A photographic apparatus for making photo-copies, in combination with a dark room having an opening, a photographic lens co-acting with the dark room opening to project an image of outside objects thereinto, an overhead support, from which said photographic lens is suspended, said support extending rearwardly into the dark room, a carriage in said dark room adjustable longitudinally of said support in a horizontal plane, and a hanger comprising leg sections at right angles to each other providing two focal areas pivotally suspended from the carriage and adapted to support sensitized sheets thereon, means cooperating with said leg sections so that one or the other of said leg sections are in the field of the lens for projecting photographs thereon.

2. A photographic apparatus for making photo-copies, in combination with a dark room having an opening, a photographic lens co-acting with the dark room opening to project an image of an outside object thereinto, an overhead support, from which said photographic lens is suspended, said support extending rearwardly into the dark room, a carriage in said dark room adjustable longitudinally of said support in a horizontal plane, and a hanger pivotally suspended from the carriage and including leg sections for supporting and exposing sensitized sheets, said hanger adapted to be swung so that one or the other of the sections is swung into the field of the lens, whereby the image projected into the dark room may be projected on a sheet carried by the section in the field of the lens.

JOHN J. JOHNSON.